United States Patent
An et al.

(10) Patent No.: US 8,109,257 B2
(45) Date of Patent: Feb. 7, 2012

(54) FLUID SELECTION VALVE UNIT, EXHAUST GAS CONTROL VALVE HAVING THE SAME, AND WASTE GATE VALVE HAVING THE SAME

(75) Inventors: Byeongil An, Sagamihara (JP); Takashi Shiraishi, Sagamihara (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 116 days.

(21) Appl. No.: 12/524,484

(22) PCT Filed: Oct. 3, 2008

(86) PCT No.: PCT/JP2008/068404
§ 371 (c)(1),
(2), (4) Date: Aug. 20, 2009

(87) PCT Pub. No.: WO2009/048115
PCT Pub. Date: Apr. 16, 2009

(65) Prior Publication Data
US 2010/0187460 A1  Jul. 29, 2010

(30) Foreign Application Priority Data
Oct. 11, 2007  (JP) ................................. 2007-265186

(51) Int. Cl.
*F02B 33/00* (2006.01)
*F02B 33/44* (2006.01)
(52) U.S. Cl. ................... 123/562; 123/568.23

(58) Field of Classification Search .................. 123/562, 123/563, 316, 559.1, 568.23, 568.24, 568.26; 60/602, 605.1, 612
See application file for complete search history.

(56) References Cited

U.S. PATENT DOCUMENTS

| 7,360,362 | B2 * | 4/2008 | Nicolle et al. | 60/612 |
| 2007/0204616 | A1 * | 9/2007 | Martin et al. | 60/602 |
| 2009/0014674 | A1 * | 1/2009 | Grissom et al. | 251/298 |

FOREIGN PATENT DOCUMENTS

| JP | 61-291725 A | 12/1986 |
| JP | 62-8333 U | 1/1987 |
| JP | 63-182234 U | 11/1988 |
| JP | 2-64725 U | 5/1990 |
| JP | 6-48119 Y2 | 12/1994 |
| JP | 2004-332686 A | 11/2004 |

* cited by examiner

*Primary Examiner* — Mahmoud Gimie
(74) *Attorney, Agent, or Firm* — Birch, Stewart, Kolasch & Birch, LLP

(57) ABSTRACT

A fluid selection valve unit comprising a valve seat having a side surface having a predetermined depth and a bottom surface continuous to the side surface and a valve member supported with a rotary shaft at one end. The valve member includes a bottom portion and a side end surface formed above the bottom portion, and is configured so that a passage area of a gap formed between the side end surface of the valve member and the side surface of the valve seat is smaller than a contact passage area formed between the bottom portion of the valve member and the bottom surface of the valve seat during a time when the bottom portion of the valve member comes into contact with the bottom surface of the valve seat by the rotation of the rotary shaft, and the rotary angle increases up to a predetermined value of the rotary angle.

5 Claims, 5 Drawing Sheets

FLUID SELECTION VALVE UNIT, EXHAUST GAS CONTROL VALVE HAVING THE SAME, AND WASTE GATE VALVE HAVING THE SAME

BACKGROUND OF THE INVENTION

1. Field of the Invention

The present invention relates to a fluid selection valve unit applied to an exhaust gas control valve, a waste gate valve, or the like which is provided between a high-pressure-stage supercharger and a low-pressure-stage supercharger of a two-stage supercharging exhaust turbocharger so as to control an amount of exhaust gas supplied to the low-pressure-stage supercharger.

2. Description of the Related Art

In recent years, a vehicle diesel engine adopts a two-stage supercharging exhaust turbocharger which includes a high-pressure-stage supercharger having a high-pressure turbine driven by exhaust gas discharged from an engine and a low-pressure-stage supercharger having a low-pressure turbine driven by the exhaust gas used to drive the high-pressure-stage supercharger, wherein the high-pressure-stage supercharger and the low-pressure-stage supercharger are arranged in series in an exhaust gas passageway, and wherein air subjected to a first-stage pressurizing operation of the low-pressure compressor of the low-pressure-stage supercharger is subjected to a second-stage pressurizing operation of the high-pressure compressor of the high-pressure-stage supercharger and is supplied to an engine.

In the engine provided with the multi-stage supercharging exhaust turbocharger, a two-stage supercharging operation using both the high-pressure-stage supercharger and the low-pressure-stage supercharger is carried out in a low-speed running region, which is advantageous in a transient characteristic and an increase of low-speed torque of the engine.

Additionally, a one-stage supercharging operation using the low-pressure-stage supercharger is carried out in a high-speed running region of the engine and upon increasing an output and a supercharging pressure of the engine by allowing the exhaust gas to bypass the high-pressure-stage supercharger. In this manner, it is possible to further improve efficiency of the compressor and thus to realize a reliable running state having an excellent degree of freedom in matching.

FIG. 4 is an explanatory view showing an operation of the two-stage supercharging exhaust turbocharger.

In FIG. 4, Reference Numeral 1 denotes a high-pressure-stage supercharger, where the high-pressure-stage supercharger 1 includes a high-pressure turbine 1a and a high-pressure compressor 1b coaxially driven by the high-pressure turbine 1a. Reference Numeral 2 denotes a low-pressure-stage supercharger, where the low-pressure-stage supercharger 2 includes a low-pressure turbine 2a and a low-pressure compressor 2b coaxially driven by the low-pressure turbine 2a.

The exhaust gas discharged from a cylinder 100 of the engine is collected in an exhaust manifold 103 and is supplied to the high-pressure turbine 1a of the high-pressure-stage supercharger 1 via an exhaust pipe 4. A part of the exhaust gas is supplied to the low-pressure turbine 2a of the low-pressure-stage supercharger 2 via an exhaust gas control valve 5, an exhaust pipe 6, and an exhaust pipe 10.

Here, the exhaust gas control valve 5 shown in a Y part of FIG. 4 is provided between the high-pressure-stage supercharger 1 and the low-pressure-stage supercharger 2, and is used to control a relationship between an amount of the exhaust gas of the high-pressure-stage supercharger 1 and an amount of the exhaust gas bypassing the high-pressure-stage supercharger 1 and supplied to the low-pressure turbine 2a of the low-pressure-stage supercharger 2 by controlling an opening degree thereof. That is, the exhaust gas passing through the high-pressure turbine 1a of the high-pressure-stage supercharger 1 and an exhaust pipe 8 and the exhaust gas of which a flow rate is controlled by the exhaust gas control valve 5 are mixed at an exhaust pipe 9 and the mixed gas is supplied to the low-pressure turbine 2a of the low-pressure-stage supercharger 2 via an exhaust pipe 10.

In the low-pressure-stage supercharger 2, the low-pressure compressor 2b is coaxially driven by the low-pressure turbine 2a so as to pressurize air supplied from an air cooler 2c, and the pressurized air is supplied to the high-pressure compressor 1b of the high-pressure-stage supercharger 1 via an air supply pipe 21 and an air supply suction pipe 18.

In the high-pressure-stage supercharger 1, the high-pressure compressor 1b is coaxially driven by the high-pressure turbine 1a so as to supply the pressurized air to a cylinder 100 of an engine via an air supply pipe 20, an intercooler 21, an air supply pipe 22, and an exhaust manifold 101.

Here, a compressor bypass valve unit 05 is provided in a bypass pipe 17 of the high-pressure compressor 1b so as to control an amount of air bypassing the high-pressure compressor 1b.

Additionally, a waste gate valve 12 is provided in a bypass pipe 11 of the low-pressure turbine 2a so as to control an amount of exhaust gas bypassing the low-pressure turbine 2a.

Here, as described above, the exhaust gas control valve 5 controls an opening degree thereof so as to control a relationship between an amount of exhaust gas of the high-pressure-stage supercharger 1 and an amount of exhaust gas bypassing the high-pressure-stage supercharger 1 and supplied to the low-pressure turbine 2a of the low-pressure-stage supercharger 2, and an example thereof is shown in FIG. 5.

In FIG. 5, the exhaust gas control valve 5 includes a valve member 054 and a valve seat 055 on which the valve member 054 is seated, where one end of the valve member 054 is supported to a rotary shaft 52 so as to be rotatable about a shaft center 52a of the rotary shaft 52 in a direction indicated by the arrow W in terms of a support arm 56.

The low surface 054a of the valve member 054 is formed into a plane. When the valve member 054 is swung about the shaft center 52a of the rotary shaft 52, a low surface 054a of the valve member 054 comes into contact with a lower surface 055a of the valve seat 055 to thereby close the valve member 054.

Upon opening the valve member 054, the rotary shaft 52 is rotated by an exhaust gas control valve driving unit (not shown) in a direction indicated by the arrow W shown in FIG. 5 so as to be away from the valve seat 055, thereby opening the valve member 054 in terms of the support arm 56.

Additionally, in Patent Document 1 (Japanese Patent Application Laid-Open No. S61-291725), an exhaust gas control valve 6 is provided between a high-pressure-stage supercharger 1 and a low-pressure-stage supercharger 2, and is used to control an opening degree thereof so as to control a relationship between an amount of exhaust gas of the high-pressure-stage supercharger 1 and an amount of exhaust gas bypassing the high-pressure-stage supercharger 1 and supplied to the low-pressure-stage supercharger 2.

FIG. 3A is a view showing a relationship between a passage area and an opening degree of the exhaust gas control valve, and FIG. 3B is a view showing a relationship between an engine rpm and an engine torque.

When the lower surface 054a of the parallel valve-type valve member 054 comes into contact with the lower surface 055a of the straight valve seat 055 as shown in FIG. 5, a passage area of the valve member 054 varies linearly with respect to the opening degree of the valve member as shown by the line B of FIG. 3A.

Meanwhile, in a variable two-stage region running state of the two-stage supercharging engine, as described above, the passage area of the valve member 054 increases linearly with respect to the opening degree of the valve member. Accordingly, upon controlling the relationship between the amount of the exhaust gas of the high-pressure-stage supercharger 1 and the amount of the exhaust gas bypassing the high-pressure-stage supercharger 1 and supplied to the low-pressure turbine 2a of the low-pressure-stage supercharger 2, the amount of the exhaust gas supplied to the low-pressure turbine 2a of the low-pressure-stage supercharger 2 increases linearly with respect to the opening degree of the valve member. Subsequently, the rpm of the low-pressure-stage supercharger 2 increases, but the rpm of the high-pressure-stage supercharger 1 abruptly decreases.

For this reason, since the control range of the flow rate of the exhaust gas using a valve is narrow in low and medium rpm regions of the engine as shown by the line B of FIG. 3B, full-load torque of the engine is more reduced than that of the control shown in FIG. 3A. Additionally, since the two-stage supercharging region is smoothly changed to the one-stage supercharging region in a high rpm region by controlling the valve, the torque reduction is prevented.

Accordingly, since the passage area of the valve member 054 abruptly varies, it is difficult to smoothly carry out the selection operation to the one-stage supercharging operation of the low-pressure-stage supercharger 2 using the gentle variation of the passage area of the valve member 054. As a result, the exhaust gas amount control using the opening degree of the valve member 054 is difficult, and the power control range of the high-pressure-stage supercharger 1 and the low-pressure-stage supercharger 2 of the variable two-stage control region is narrowed.

SUMMARY OF THE INVENTION

The present invention is contrived in consideration of the above-described problems, and an object of the invention is to provide a fluid selection valve unit which is applicable to an exhaust gas control valve, a waste gate valve, or the like provided between a high-pressure-stage supercharger and a low-pressure-stage supercharger of a two-stage supercharging exhaust turbocharger so as to control an amount of exhaust gas supplied to the high-pressure-stage supercharger and the low-pressure-stage supercharger, and which is capable of improving control performance of a valve in such a manner that a passage area gently varies with respect to an opening degree of a valve member so as to minutely control an exhaust gas amount by using the opening degree of the valve.

In order to achieve the above-described object, according to Aspect 1 of the invention, there is provided a fluid selection valve unit including: a valve seat provided in a fluid passage; and a valve member of which one end is supported to a rotary shaft so as to be rotatable about a shaft center of the rotary shaft in a direction moving away from the valve seat, wherein the valve seat includes a side surface having a predetermined depth and a bottom surface continuous to the side surface, wherein the valve member includes a bottom portion and a side end surface formed above the bottom portion, and wherein the valve member is configured so that a passage area of a gap formed between the side end surface of the valve member and the side surface of the valve seat is smaller than a contact passage area formed between the bottom portion of the valve member and the bottom surface of the valve seat during a time when the bottom portion of the valve member comes into contact with the bottom surface of the valve seat, and the rotary angle increases up to a predetermined value of the rotary angle.

The fluid selection valve according to Aspect 1 may be applied to an exhaust gas control valve for selectively controlling flow rates of an exhaust gas passageway of a high-pressure-stage supercharger, including a high-pressure turbine driven by exhaust gas discharged from an exhaust manifold, and an exhaust gas passageway of a low-pressure-stage supercharger, including a low-pressure turbine driven by the exhaust gas used to drive the high-pressure-stage supercharger.

Specifically, in the exhaust gas control valve, the valve seat is directly processed in an exhaust manifold casing or is fixed thereto, the inside of the valve seat is formed into an annular ring formed in the exhaust gas passageway, and the valve seat includes the side surface having the predetermined depth from the top surface of the ring and the bottom surface continuous to the side surface.

The valve member is formed into a saucer-shape member supported to a free end of the support arm supported to the rotary shaft so as to be rotatable about the shaft center of the rotary shaft in a direction moving away from the valve seat. The side surface of the saucer-shape member is formed into the side end surface.

The valve member is regulated so that the passage area of the gap formed between the side surface of the valve seat and the side end surface of the saucer-shape member is smaller than the contact passage area formed between the bottom surface of the valve seat and the bottom portion of the valve member during a time when the bottom portion of the valve member comes into contact with the bottom surface of the valve seat to close the valve member, the rotary shaft is rotated to open the valve member, and then the rotary angle increases up to the predetermined value of the rotary angle.

The fluid selection valve unit according to Aspect 1 may be applied to a waste gate valve for allowing a part of exhaust gas supplied to a supercharger including a turbine driven by exhaust gas discharged from an exhaust manifold to bypass the supercharger to be discharged to an exhaust outlet.

In the waste gate valve, the valve seat is directly processed in a bypass passage wall or is fixed thereto, the inside of the valve seat is formed into an annular ring formed in a bypass passage, and the valve seat includes the side surface having a predetermined depth from a top surface of the ring and the bottom surface continuous to the side surface. The valve member is formed into a saucer-shape member supported to a free end of a support arm supported to the rotary shaft so as to be rotatable about the shaft center in a direction moving away from the valve seat, and a side surface of the saucer-shape member is formed into the side end surface. The valve member is regulated so that the passage area of the gap formed between the side end surface of the saucer-shape member and the side surface of the valve seat is smaller than the contact passage area formed between the bottom portion of the valve member and the bottom surface of the valve seat during a time when the bottom portion of the valve member comes into contact with the bottom surface of the valve seat to close the valve member.

According to the invention, in the fluid selection valve unit, one end of the valve member is supported to the rotary shaft so as to be rotatable about the shaft center of the rotary shaft in a direction moving away from the valve seat, and the valve member includes the bottom portion and the side end surface formed above the bottom portion. The valve seat includes the side surface having a predetermined depth and the bottom surface continuous to the side surface. The valve member is configured so that the passage area of the gap formed between the side end surface of the valve member and the side surface of the valve seat is smaller than the contact passage area formed between the bottom portion of the valve member and the bottom surface of the valve seat during a time when the valve member comes into contact with the bottom surface of the valve seat, and the rotary angle increases about the shaft center up to a predetermined value of the rotary angle. As shown by the line A of FIG. 3A, in the passage area of the valve member, the passage area of the valve member gently varies with respect to the opening degree variation of the valve member so that the passage area formed between the side end surface of the valve member and the side surface of the valve seat in accordance with the opening degree variation of the valve member is smaller than the contact passage area formed between the bottom portion of the valve member and the bottom surface of the valve seat during a time when the rotary angle increases about the shaft center of the valve member up to a predetermined value of the rotary angle.

Accordingly, when the fluid selection valve unit is applied to the exhaust gas control valve, in the exhaust gas control valve, the valve seat is directly processed in the exhaust manifold casing or is fixed thereto, the inside of the valve seat is formed into an annular ring formed in the exhaust gas passageway, and the valve seat includes the side surface having the predetermined depth from the top surface of the ring and the bottom surface continuous to the side surface. The valve member is formed into a saucer-shape member supported to a free end of the support arm supported to the rotary shaft so as to be rotatable about the shaft center of the rotary shaft in a direction moving away from the valve seat. The side surface of the saucer-shape member is formed into the side end surface. The valve member is regulated so that the passage area of the gap formed between the side surface of the valve seat and the side end surface of the saucer-shape member is smaller than the contact passage area formed between the bottom surface of the valve seat and the bottom portion of the valve member during a time when the bottom portion of the valve member comes into contact with the bottom surface of the valve seat to close the valve member, the rotary shaft is rotated to open the valve member, and then the rotary angle increases up to the predetermined value of the rotary angle. In the relationship between the amount of the exhaust gas of the high-pressure-stage supercharger and the amount of the exhaust gas bypassing the high-pressure-stage supercharger and supplied to the low-pressure turbine of the low-pressure-stage supercharger, since the passage area of the gap formed between the side surface of the valve seat and the side end surface of the saucer-shape member is regulated to be smaller than the contact passage area formed between the bottom surface of the valve seat and the bottom portion of the valve member during a time when the rotary shaft is rotated to open the valve member, and the rotary angle increases up to the predetermined value of the rotary angle, the passage area of the valve member gently varies with respect to the opening degree variation of the valve member, and the rpm of the low-pressure-stage supercharger gradually increases, thereby smoothly carrying out the selection operation to the one-stage supercharging operation of the low-pressure-stage supercharger.

Accordingly, since it is easy to control the exhaust gas amount by using the valve opening degree of the valve member, it is possible to easily widen the power control range of the high-pressure-stage supercharger and the low-pressure-stage supercharger in the variable two-stage control.

Additionally, when the fluid selection valve unit is applied to the waste gate valve, in the waste gate valve for allowing a part of the exhaust gas of the supercharger to bypass the supercharger to be discharged to the exhaust outlet, the valve seat is directly processed in a bypass passage wall or is fixed thereto, the inside of the valve seat is formed into an annular ring formed in a bypass passage, and the valve seat includes the side surface having a predetermined depth from a top surface of the ring and the bottom surface continuous to the side surface. The valve member is formed into a saucer-shape member supported to a free end of a support arm supported to the rotary shaft so as to be rotatable about the shaft center in a direction moving away from the valve seat, and a side surface of the saucer-shape member is formed into the side end surface. The valve member is regulated so that the passage area of the gap formed between the side end surface of the saucer-shape member and the side surface of the valve seat is smaller than the contact passage area formed between the bottom portion of the valve member and the bottom surface of the valve seat during a time when the bottom portion of the valve member comes into contact with the bottom surface of the valve seat to close the valve member. Accordingly, the passage area of the valve member gently varies with respect to the opening degree variation of the valve member, and the rpm of the supercharger gradually increases due to the gentle variation of the passage area of the valve member, thereby gently and smoothly extracting the exhaust gas supplied to the supercharger by preventing a part of the exhaust gas from being abruptly extracted from the supercharger.

DESCRIPTION OF THE PREFERRED EMBODIMENTS

Hereinafter, exemplary embodiments of the invention will be described in detail with reference to the accompanying drawings. Here, although the dimension, the material, the shape, the relative arrangement, and the like of the component are described in the embodiment, the scope of the invention is not limited thereto so long as a particular description is not made, but those are only examples for a description.

First Embodiment

Figure 1:
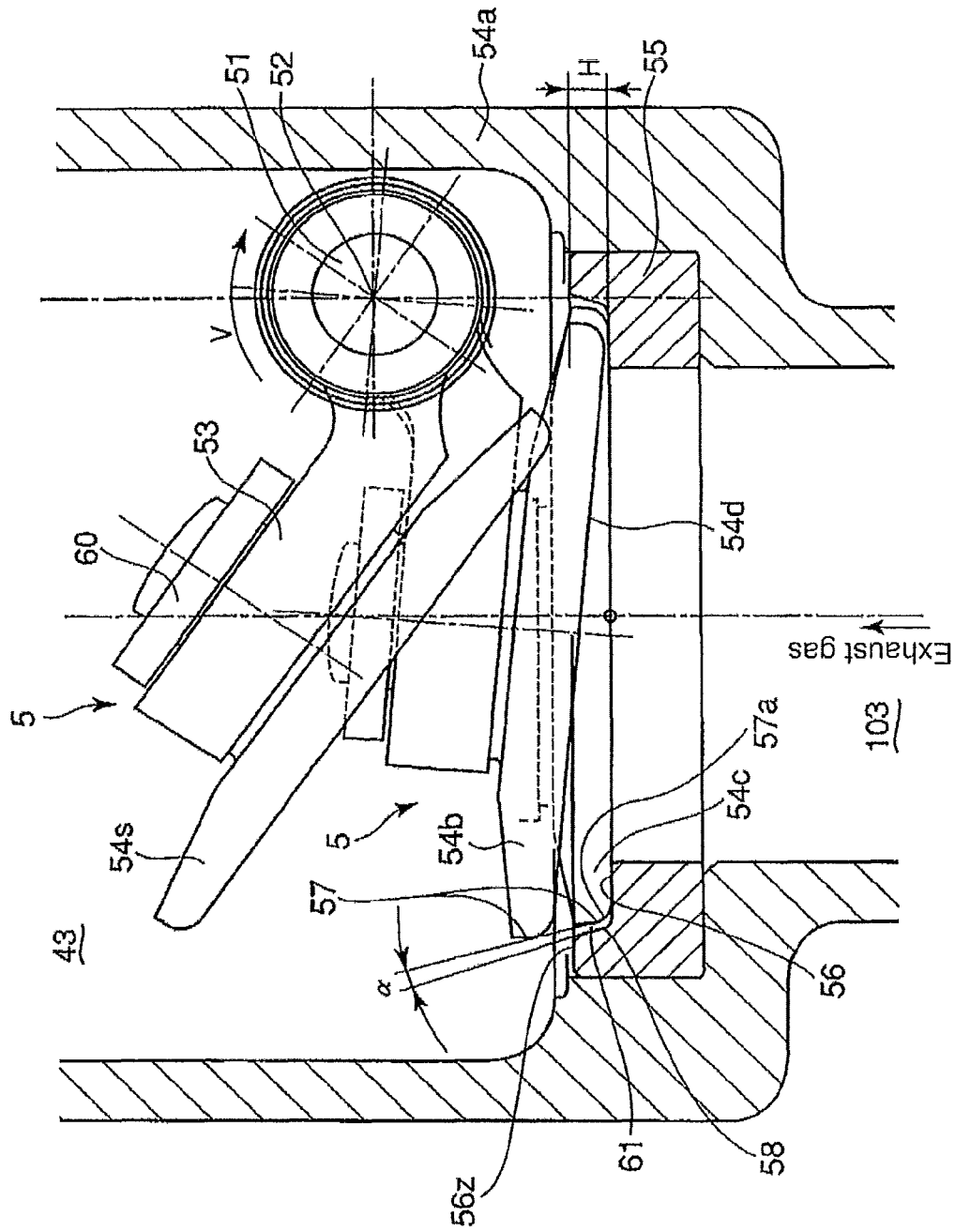
FIG. 1 is an enlarged sectional view (specific view of a W part shown in FIG. 2) showing an attachment portion of an exhaust gas control valve according to a first embodiment of the invention.
Figure 2:
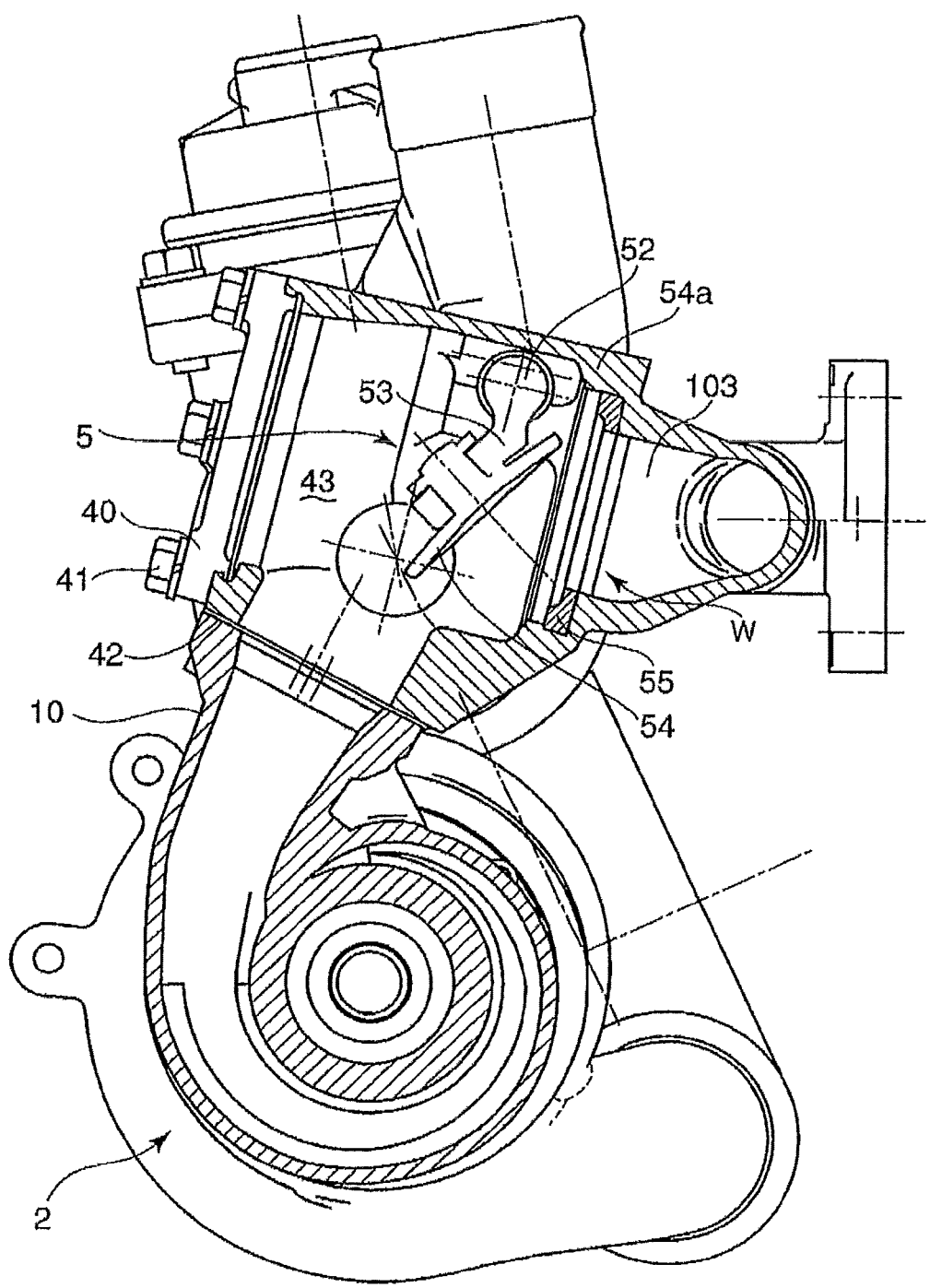
FIG. 2 is a specific sectional view (specific view of a Y part shown in FIG. 4) showing the attachment portion of the exhaust gas control valve of a two-stage supercharging exhaust turbocharger according to the first embodiment of the invention.

FIG. 1 is an enlarged sectional view (specific view of a W part shown in FIG. 2) showing an attachment portion of an exhaust gas control valve according to a first embodiment of the invention. FIG. 2 is a specific sectional view (specific view of a Y part shown in FIG. 4) showing the attachment portion of the exhaust gas control valve of a two-stage supercharging exhaust turbocharger according to the first embodiment of the invention.

In the first embodiment, a fluid selection valve unit according to the invention is applied to an exhaust gas control valve 5.

Figure 4:
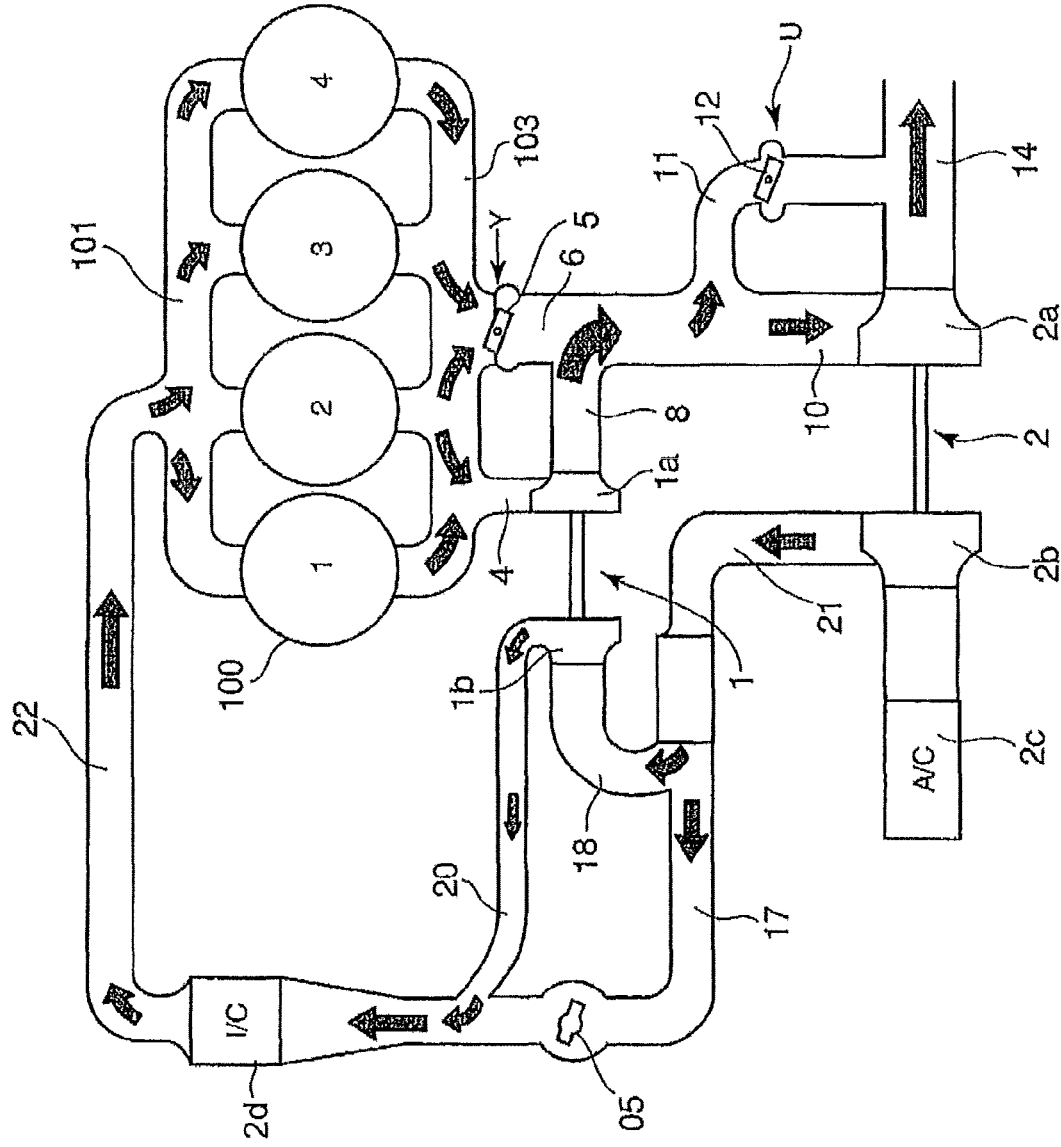
FIG. 4 is an explanatory view showing an operation of the two-stage supercharging exhaust turbocharger.
Figure 5:
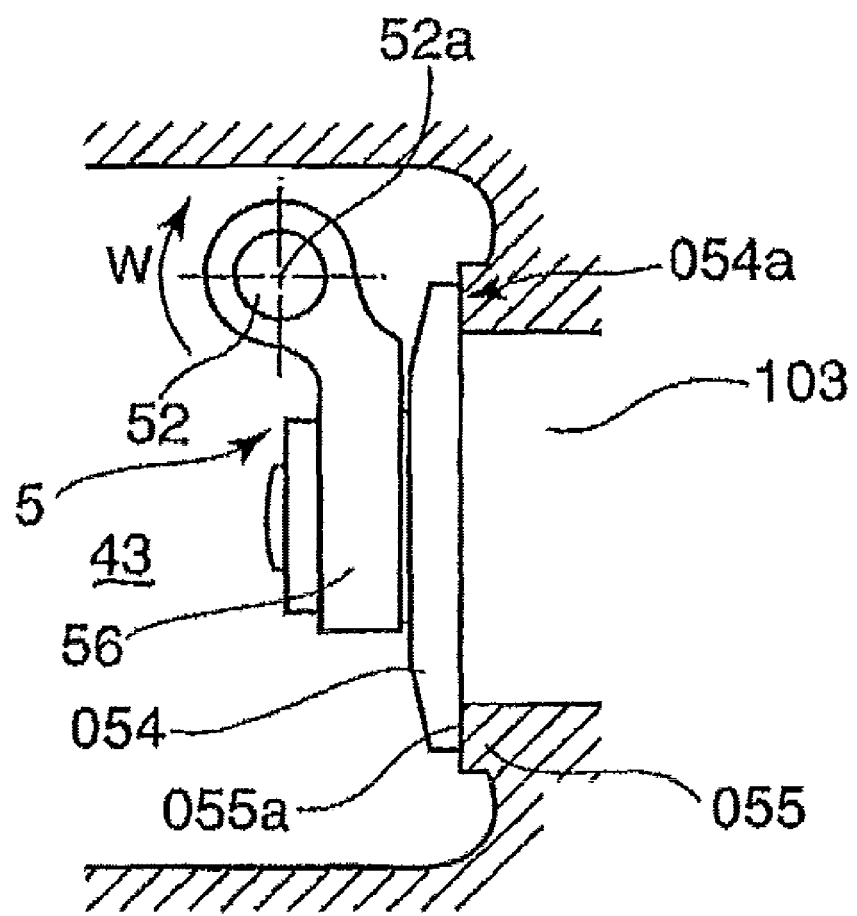
FIG. 5 is a side view showing the exhaust gas control valve according to a conventional art.

In FIGS. 2 and 4, exhaust gas discharged from a cylinder 100 of an engine is collected in an exhaust manifold 103 and is supplied to a high-pressure-stage supercharger 1. Meanwhile, the exhaust gas collected in the exhaust manifold 103 formed in an exhaust manifold casing 54a is supplied to a low-pressure-stage supercharger 2 via the exhaust gas control valve 5 and a low-pressure inlet casing 10. The low-pressure inlet casing 10 is fixed to a lower surface 42 of the exhaust manifold casing 54a by the use of a bolt. A valve seat 55 is press-fitted to the exhaust manifold casing 54a.

Reference Numeral 40 denotes a cover of a valve chamber 43 formed in the exhaust manifold casing 54a, the cover 40 being fixed by the use of a plurality of bolts 41.

In FIG. 1, the exhaust gas control valve 5 controls an opening degree thereof so as to control a relationship between an amount of exhaust gas of the high-pressure-stage supercharger 1 and an amount of exhaust gas which is supplied to a low-pressure turbine 2a of the low-pressure-stage supercharger 2 after bypassing the high-pressure-stage supercharger 1.

In FIG. 1, the exhaust gas control valve 5 includes a valve member 54 and the valve seat 55 on which the valve member 54 is seated, where one end of the valve member 54 is supported to a rotary shaft 51 so as to be rotatable about a shaft center 52 of the rotary shaft 51 in terms of a support arm 53. Upon opening the valve member 54, the rotary shaft 51 is rotated by an exhaust gas control valve driving unit (not shown) in a direction indicated by the arrow V shown in FIG. 1 so as to be away from the valve seat 55, thereby opening the valve member 54 in terms of the support arm 53.

Accordingly, the exhaust gas discharged from the exhaust manifold 103 is supplied to the valve chamber 43 and the low-pressure inlet casing 10 via the valve member 54 so as to be introduced into the low-pressure-stage supercharger 2. Reference Numeral 60 denotes a gap adjusting plate used upon closing the valve.

In the present invention, the exhaust gas control valve 5 has the following configuration.

The valve seat 55 includes a side surface 58 inclined slightly outward and having a predetermined depth H from a top surface 56z and a bottom surface 56 continuous to the side surface 58.

Additionally, the valve member 54 includes a bottom portion 54d and a side end surface 57 formed above the bottom portion 54d and having an open angle α with respect to the side surface 58.

Then, in the valve seat 55 and the valve member 54, when the valve member is completely closed as shown by the valve member 54c of FIG. 1, the bottom portion 54d of the valve member 54 comes into contact with the lower surface 56 of the valve seat 55. In this state, a minute gap 61 having the open angle α is formed by the predetermined depth H between the side end surface 57 of the valve member 54 and the side surface 58 of the valve seat 55.

Subsequently, when the valve member 54 is rotated and opened in a direction indicated by the arrow V so as to be away from the valve seat 55, the valve member 54 is opened while forming the gap 61 having the open angle α formed between the side end surface 57 of the valve member 54 and the side surface 58 of the valve seat 55 by the predetermined depth H in accordance with the increase of the rotary angle V about the shaft center 51.

At this time, an opening area of the valve member 54 is equal to an area of the gap 61, and the opening area is smaller than an opening area formed between a seat surface 56 of the valve seat 55 and the bottom portion 54d of the valve member 54 all the time.

Then, when a lower edge 57a of the side end surface 57 of the valve member 54 is located above the top surface 56z of the valve seat 55 like the valve member 54b shown in FIG. 1, the gap 61 having the open angle α is in an open state to thereby have an opening area formed between the seat surface 56 of the valve seat 55 and the bottom portion 54d of the valve member 54.

Figure 3A:
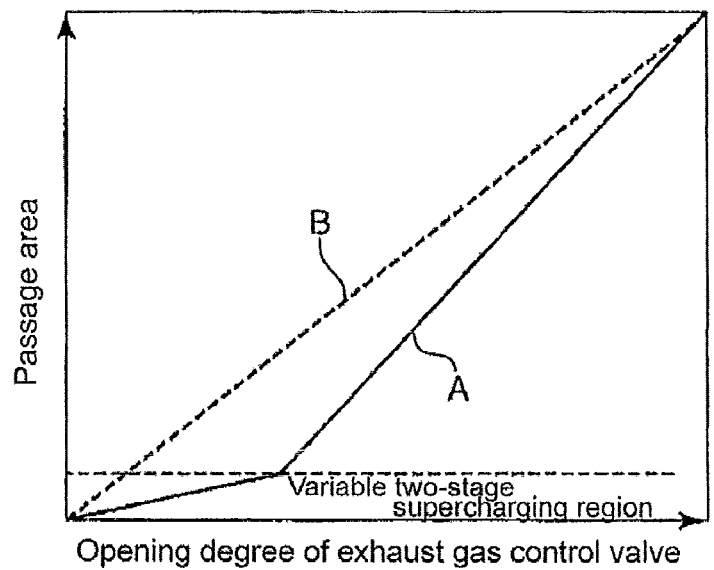
FIG. 3A is a view showing a relationship between a passage area and an opening degree of the exhaust gas control valve and FIG. 3B is a view showing a relationship between an engine torque and an engine rpm.

Accordingly, when comparing with the flat line B according to the conventional art, as shown by the line A of FIG. 3A, the passage area of the valve member 54 gently varies so that the passage area of the gap 61, formed between the side surface 58 of the valve seat 55 and the side end surface 57 of the valve member 54, is smaller than the contact passage area, formed between the bottom surface 56 of the valve seat 55 and the bottom portion 54c of the valve member 54 in accordance with the opening degree variation of the valve member 54, during a time when the rotary angle V increases about the shaft center of the valve member 54 up to a predetermined value of the rotary angle V, that is, the predetermined depth H.

Figure 3B:
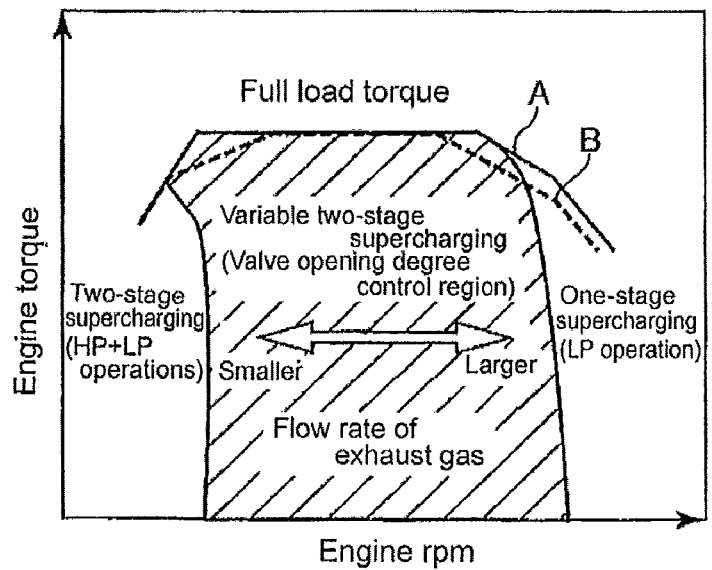

Accordingly, since the passage area of the valve member 54 with respect to the opening degree variation of the valve member 54 gently varies as shown by the line A of FIG. 3A, it is possible to smoothly change the running state from the high-pressure-stage supercharger 1 to the low-pressure-stage supercharger 2 and thus to prevent a reduction of full-load torque of the engine as shown by the line A of FIG. 3B. Then, a full opening position of the valve member 54 is depicted as the valve member 54s in the drawing.

That is, in the exhaust gas control valve 5 according to the embodiment, specifically, the valve seat 54 is directly processed in the exhaust manifold casing 54a or is fixed thereto, the inside of the valve seat is formed into an annular ring formed in the exhaust gas passageway, and the valve seat 54 includes the side surface 58 having the predetermined depth H from the top surface of the ring and the bottom surface 56 continuous to the side surface 58. The valve member 54 is formed into a saucer-shape member which is supported to a free end of a support arm 53 supported to the rotary shaft 51 so as to be rotatable about the shaft center 52 of the rotary shaft 51 in a direction moving away from the valve seat 55. The side surface of the saucer-shape member is formed into the side end surface 57. The valve member 54 is regulated so that the passage area of the gap 61 formed between the side surface 58 of the valve seat 55 and the side end surface 57 of the saucer-shape member is smaller than the contact passage area formed between the bottom surface 56 of the valve seat 55 and the bottom portion 54d of the valve member 54 during a time when the bottom portion 54d of the valve member 54 comes into contact with the bottom surface 56 of the valve seat 55 to close the valve member 54, the rotary shaft 51 is rotated to open the valve member 54, and then the rotary angle V increases up to the predetermined value of the rotary angle V.

In the relationship between the amount of the exhaust gas of the high-pressure-stage supercharger 1 and the amount of the exhaust gas bypassing the high-pressure-stage supercharger 1 and supplied to the low-pressure turbine 2a of the low-pressure-stage supercharger 2, since the passage area of the gap 61 formed between the side surface 58 of the valve seat 55 and the side end surface 57 of the saucer-shape member is regulated to be smaller than the contact passage area formed between the bottom surface 56 of the valve seat 55 and the bottom portion 54d of the valve member 54 during a time when the rotary shaft 51 is rotated to open the valve member 54, and the rotary angle V increases up to the predetermined value of the rotary angle V, the passage area of the valve member 54 gently varies with respect to the opening degree variation of the valve member 54, and the rpm of the low-pressure-stage supercharger 2 gradually increases, thereby smoothly carrying out the selection operation to the one-stage supercharging operation of the low-pressure-stage supercharger 2.

Accordingly, in the exhaust gas control valve 5 having the structure of the connection portion of the valve seat 55 on which the valve member 54 is seated, since the passage area of the valve member 54 gently varies with respect to the opening degree variation of the valve member 54 in the relationship between the amount of the exhaust gas of the high-pressure-stage supercharger 1 and the amount of the exhaust gas bypassing the high-pressure-stage supercharger 1 and supplied to the low-pressure turbine 2a of the low-pressure-stage supercharger 2, the rpm of the low-pressure-stage supercharger gradually increases due to the gentle variation of the passage area of the valve member 54, thereby smoothly carrying out the selection operation to the one-stage supercharging operation of the low-pressure-stage supercharger 2.

Accordingly, since it is easy to control the exhaust gas amount by using the valve opening degree of the valve member 54, it is possible to easily widen the power control range of the high-pressure-stage supercharger 1 and the low-pressure-stage supercharger 2 in the variable two-stage control.

Second Embodiment

In a second embodiment of the invention, the fluid selection valve unit according to the invention is applied to a waste gate valve.

A waste gate valve 12 shown in a U part of FIG. 4 is provided in a bypass pipe 11 of the low-pressure turbine 2a so as to control the amount of the exhaust gas bypassing the low-pressure turbine 2a. It is possible to apply the fluid selection valve unit having the same configurations as described above to the waste gate valve 12.

That is, the exhaust gas control valve 5 shown in FIG. 1 may be totally exchanged with the waste gate valve 12. In this case, the exhaust manifold casing 54a is exchanged with the bypass pipe 11 shown in FIG. 4 so that the exhaust gas passes through the bypass pipe 11, and the flow rate of the exhaust gas passing through the bypass pipe 11 is controlled by the waste gate valve 12 having the configuration shown in FIG. 1.

With such a configuration, in the waste gate valve 12 in which a part of the exhaust gas of the low-pressure-stage supercharger 2 bypasses the low-pressure turbine 2a of the low-pressure-stage supercharger 2 and is discharged to an exhaust outlet 14 (see FIG. 4), as shown in FIG. 1, the valve seat 54 is fixed to the passage of the bypass pipe 11, and the inside thereof is formed into an annular ring formed in the passage of the bypass pipe 11, the valve seat 54 including the side surface 58 having the predetermined depth H from the top surface of the ring and the bottom surface 56 continuous to the side surface 58. The valve member 54 is formed into a saucer-shape member which is supported to a free end of the support arm 53 supported to the rotary shaft 51 so as to be rotatable about the shaft center 52 of the rotary shaft 51 in a direction moving away from the valve seat 55. The side surface of the saucer-shape member is formed into the side end surface 57.

Then, since the valve member 54 is regulated so that the passage area of the gap 61 formed between the side surface 58 of the valve seat 55 and the side end surface 57 of the rotary shaft 51 is smaller than the contact passage area formed between the lower surface 56 of the valve seat 55 and the lower portion 54d of the valve member 54 during a time when the bottom portion 54d of the valve member 54 comes into contact with the bottom surface 56 of the valve seat 55 to close the valve member 54, the passage area of the valve member 54 gently varies with respect to the opening degree variation of the valve member 54, and the rpm of the low-pressure-stage supercharger gradually increases due to the gentle variation of the passage area of the valve member 54, thereby gently and smoothly extracting the exhaust gas from the low-pressure-stage supercharger 2 by preventing a part of the exhaust gas from being abruptly extracted from the low-pressure-stage supercharger 2.

That is, in the waste gate valve 12 in which a part of the exhaust gas of the low-pressure-stage supercharger 2 bypasses the low-pressure-stage supercharger 2 and is discharged to the exhaust outlet, since the passage area of the valve member 54 gently varies with respect to the opening degree variation of the valve member 54, the rpm of the low-pressure-stage supercharger 2 gradually increases due to the gentle variation of the passage area of the valve member 54, thereby gently and smoothly extracting the exhaust gas from the low-pressure-stage supercharger 2 by preventing a part of the exhaust gas from being abruptly extracted from the low-pressure-stage supercharger 2.

According to the invention, it is possible to provide the fluid selection valve unit which is applicable to the exhaust gas control valve, the waste gate valve, or the like provided between the high-pressure-stage supercharger and the low-pressure-stage supercharger of the two-stage supercharging exhaust turbocharger so as to control the amount of the exhaust gas supplied to the high-pressure-stage supercharger and the low-pressure-stage supercharger, and which is capable of improving the control performance of the valve in such a manner that the passage area gently varies with respect to the opening degree of the valve member so as to minutely control the exhaust gas amount by using the opening degree of the valve.

The invention claimed is:

1. A fluid selection valve unit comprising:
   a valve seat provided in a fluid passage; and
   a valve member of which one end is supported to a rotary shaft so as to be rotatable about a shaft center of the rotary shaft in a direction moving away from the valve seat,
   wherein the valve seat includes a side surface having a predetermined depth and a bottom surface continuous to the side surface,
   wherein the valve member includes a bottom portion and a side end surface formed above the bottom portion, and
   wherein the valve member is configured so that a passage area of a gap formed between the side end surface of the valve member and the side surface of the valve seat is smaller than a contact passage area formed between the bottom portion of the valve member and the bottom surface of the valve seat during a time when the bottom portion of the valve member comes into contact with the bottom surface of the valve seat, and the rotary angle increases up to a predetermined value of the rotary angle.

2. An exhaust gas control valve which comprises the fluid selection valve unit according to claim 1 and selectively controls flow rates of an exhaust gas passageway of a high-pressure-stage supercharger, including a high-pressure turbine driven by exhaust gas discharged from an exhaust manifold, and an exhaust gas passageway of a low-pressure-stage supercharger, including a low-pressure turbine driven by the exhaust gas used to drive the high-pressure-stage supercharger.

3. The exhaust gas control valve according to claim 2, wherein the valve seat is directly processed in an exhaust manifold casing or is fixed thereto, the inside of the valve seat is formed into an annular ring formed in the exhaust gas passageway, and the valve seat includes the side surface having a predetermined depth from a top surface of the ring and the bottom surface continuous to the side surface, wherein the valve member is formed into a saucer-shape member supported to a free end of a support arm supported to the rotary shaft so as to be rotatable about the shaft center in a direction moving away from the valve seat, and a side surface of the saucer-shape member is formed into the side end surface, and wherein the valve member is regulated so that the passage area of the gap formed between the side end surface of the saucer-shape member and the side surface of the valve seat is smaller than the contact passage area formed between the bottom portion of the valve member and the bottom surface of the valve seat during a time when the bottom portion of the valve member comes into contact with the bottom surface of the valve seat to close the valve member, the rotary shaft is rotated to open the valve member, and then the rotary angle increases up to the predetermined value of the rotary angle.

4. A waste gate valve which comprises the fluid selection valve unit according to claim 1 and allows a part of exhaust gas supplied to a supercharger including a turbine driven by the exhaust gas discharged from an exhaust manifold to bypass the supercharger to be discharged to an exhaust outlet.

5. The waste gate valve according to claim 4, wherein the valve seat is directly processed in a bypass passage wall or is fixed thereto, the inside of the valve seat is formed into an annular ring formed in a bypass passage, and the valve seat includes the side surface having a predetermined depth from a top surface of the ring and the bottom surface continuous to the side surface, wherein the valve member is formed into a saucer-shape member supported to a free end of a support arm supported to the rotary shaft so as to be rotatable about the shaft center in a direction moving away from the valve seat, and a side surface of the saucer-shape member is formed into the side end surface, and wherein the valve member is regulated so that the passage area of the gap formed between the side end surface of the saucer-shape member and the side surface of the valve seat is smaller than the contact passage area formed between the bottom portion of the valve member and the bottom surface of the valve seat during a time when the bottom portion of the valve member comes into contact with the bottom surface of the valve seat to close the valve member.

* * * * *